United States Patent
Van Liere et al.

(10) Patent No.: US 6,453,659 B1
(45) Date of Patent: Sep. 24, 2002

(54) DEVICE FOR COMPRESSING A GASEOUS MEDIUM AND SYSTEMS COMPRISING SUCH DEVICE

(75) Inventors: Jacobus Van Liere, Doorwerth; Cornelis Adrianus Antonius Van Paassen, Den Hoorn, both of (NL)

(73) Assignee: N. V. Kema (NL)

( * ) Notice: Subject to any disclaimer, the term of this patent is extended or adjusted under 35 U.S.C. 154(b) by 0 days.

(21) Appl. No.: 09/486,133
(22) PCT Filed: Jun. 18, 1999
(86) PCT No.: PCT/NL99/00380
§ 371 (c)(1), (2), (4) Date: May 18, 2000
(87) PCT Pub. No.: WO99/67519
PCT Pub. Date: Dec. 29, 1999

(30) Foreign Application Priority Data

Jun. 24, 1998 (NL) .............................................. 1009484
Feb. 24, 1999 (NL) .............................................. 1011383

(51) Int. Cl.⁷ ................................................ F02C 7/00
(52) U.S. Cl. .................. 60/39.53; 60/728; 123/541; 123/542
(58) Field of Search ............... 60/775, 39.53, 60/728; 123/542, 541

(56) References Cited

U.S. PATENT DOCUMENTS

| | | | | |
|---|---|---|---|---|
| 3,885,390 A | * | 5/1975 | Evans | 60/531 |
| 3,964,263 A | * | 6/1976 | Tibbs | 123/193.3 |
| 3,973,395 A | * | 8/1976 | Markowski et al. | 431/352 |
| 4,189,914 A | | 2/1980 | Marek et al. | 60/726 |
| 4,261,169 A | * | 4/1981 | Zimmern | 60/39.05 |
| 4,383,645 A | | 5/1983 | Figiel et al. | 239/13 |
| 4,478,553 A | | 10/1984 | Leibowitz et al. | 416/97 R |
| 5,375,580 A | * | 12/1994 | Stolz et al. | 123/527 |
| 5,388,397 A | | 2/1995 | Frutschi | 60/39.05 |
| 5,622,044 A | * | 4/1997 | Bronicki et al. | 60/39.182 |
| 5,669,217 A | * | 9/1997 | Anderson | 60/39.05 |
| 6,216,443 B1 | * | 4/2001 | Utamura | 60/39.53 |

FOREIGN PATENT DOCUMENTS

| | | |
|---|---|---|
| DE | 2925091 | 1/1981 |
| DE | 2931178 | 2/1981 |
| DE | 4114678 | 11/1992 |
| EP | 0379880 | 8/1990 |
| EP | 0524435 | 1/1993 |
| EP | 0821137 | 1/1998 |
| GB | 0384667 | 12/1932 |
| JP | 59160032 | 1/1994 |
| NL | 0039361 | 10/1936 |

* cited by examiner

*Primary Examiner*—Ehud Gartenberg
(74) *Attorney, Agent, or Firm*—Webb Ziesenheim Logsdon Orkin & Hanson, P.C.

(57) ABSTRACT

A device for compressing a gaseous medium such as those used in energy generating systems or gas separation systems, including a compressor unit provided with a medium inlet, an outlet for the compressed medium and with means for the atomising of a liquid evaporation agent in the medium, wherein the atomising means include at least one flash swirl atomisation unit, arranged and mounted such that the atomised evaporation agent fragmentises by means of the formation of gas in the atomised evaporation agent.

18 Claims, 8 Drawing Sheets

DEVICE FOR COMPRESSING A GASEOUS MEDIUM AND SYSTEMS COMPRISING SUCH DEVICE

BACKGROUND OF THE INVENTION

1. Field of the Invention

The present invention concerns a device for the compressing of a gaseous medium and systems that apply such compressing devices, such as energy generating systems, gas separators, compressors and compressor systems for natural gas, air, and chemicals—such as ammoniac.

2. Brief Description of the Prior Art

Compressing a gaseous medium requires compression work, which work is directly proportional to the absolute temperature of the medium to be compressed. This means that compression work may be reduced by cooling the medium before and during the compression, and in the event of recycling, also after compression. This applies also if the medium is compressed successively in various stages. The main objective is a virtually ideal or quasi-isothermal compression.

The medium is cooled by introducing a liquid evaporation agent (usually water). The evaporation agent is introduced in the form of droplets that evaporate. The heat required for evaporation is provided by the medium, which consequently cools.

In principle, it is not necessary that the sprayed droplets of the evaporation agent evaporate completely. Incomplete evaporation of the droplets, however, may result in droplets of the evaporation agent coming into contact with the interior of the compressor unit, which may lead to erosion and corrosion of parts of the compressor unit.

The objective, therefore, is to introduce as tiny droplets as possible (1–10 $\mu$m). The smaller the droplets, the likelier the possibility that they will evaporate completely, but also the less likely that they will come into contact with the structure of the compressor unit. However, if the medium has a high velocity and/or the air residence time in the compressor unit is short, there usually is insufficient time for full evaporation.

DE-A-41 14 678 relates to a method for the atomisation of a fluid for a gas turbine. The atomisation of the fluid has to take place over the entire length of the compressor at a spraying pressure of 5–20 bar above the compressor pressure. The maximum quantity of fluid to be atomised—water in particular—lies between 0 to 0.2 kilogram per kilogram air and may not be exceeded. Finally, it is indicated that the manner wherein the fluid is atomised in the compressor has not yet been constructively solved.

U.S. Pat. No. 4,478,553 relates to the isothermal compression in the compressor of a gas turbine. Atomising means are strategically positioned in the rotor structure. The water to be dispersed is not pre-heated and the size of the droplets of the atomised evaporation agent is preferably maintained at between 2 and 10 $\mu$m.

U.S. Pat. No. 5,388,397 relates to a method for operating a turbocompressor, whereby air is compressed in two stages and cooled in between in an intercooler. The warm water of the intercooler is cooled in subsequent evaporating vessels and the resulting steam is transferred very compactly to the environment by spontaneous evaporation according to a flash method. The evaporated amount is made up to by a corresponding amount of fresh water.

EP-A 0 821 137 describes a system for generating energy, whereby the gas to be compressed is cooled by atomising water droplets with a drop size of 1–5 $\mu$m. Under certain conditions, however, the required flow rate of atomised water droplets is too small.

SUMMARY OF THE INVENTION

The present invention aims to provide a compressor device in which a gaseous medium may be compressed at relatively low temperatures by applying very small droplets of evaporation agent (the median is smaller than 5 $\mu$m, generally smaller than 3 $\mu$m, preferably smaller than 2 $\mu$m, e.g. 1.2 $\mu$m) whereas sufficient flow rate of this type of atomised droplets may be generated in dependency of the flow rate of the medium to be compressed.

Simultaneously, the present invention aims to provide a very adequate manner of cooling a gaseous medium, so that the cooling capacity of existing or required gas coolers (intercoolers) may be reduced or that they may be replaced.

This is achieved according to the invention by a device for compressing a gaseous medium, generally including a compressor unit provided with a medium inlet, an outlet for the compressed medium and of means for atomising a liquid evaporation agent in the medium, wherein the atomising means have at least one flash atomisation unit, mounted and arranged such, that the atomised evaporation agent fragmentises by the formation of gas in the atomised evaporation agent.

The atomising means of this compressor unit includes an inlet for evaporation agent and an outlet for evaporation agent into the gaseous medium line. It is possible that this gaseous medium still has to be compressed, is in the process of being compressed or has already been compressed. In the latter instance, the compressed medium may still be added to a subsequent compressing unit or may in part be recirculated. The atomising means usually also contain a very large number of atomisers via which the evaporation agent is sprayed into the gaseous medium.

In principle, any known type of atomiser may be used in the flash atomisation unit. Suitable ones are, for example, swirl atomisers, slot atomisers, orifice atomisers, rotating bowl atomisers and, if necessary, pen atomisers. Of importance is only that the atomiser gives off droplets or a film of evaporation agent to the gaseous medium, under circumstances changed to such extent that flash atomisation takes place subsequently. Flash atomisation means that the liquid evaporation agent arrives in the gaseous medium under such conditions that as a result of the pressure drop over the atomiser, boiling bubbles or gas bubbles are generated in the droplets or film of the evaporation agent, i.e. gas or vapour is formed in the evaporation agent. This so-called flashing or precipitation results in the explosion or fragmentation of the droplets or film of the evaporation agent as a result of the sudden partial boiling or gas precipitation. Such fragmentation results in the generation of very tiny droplets of evaporation agent in the gaseous medium. After fragmentation, the median size of the evaporation agent is less than 5 $\mu$m, in general smaller than 3 $\mu$m, preferably smaller than 2 $\mu$m, e.g. 1.2 $\mu$m.

This means that atomisers may be employed in the atomising means insofar as they result in droplets of the said median size after fragmentation. Of importance in this respect is that the atomising means, the flash atomisation units in particular, are mounted and arranged such that the atomised evaporation agent fragments by the generation of gas in the atomised evaporation agent.

Preferably, a flash atomisation unit is used that is provided with swirl atomisers. In such a known swirl atomiser, the evaporation agent is put in swirling motion in a swirl chamber. The swirling evaporation agent exits via an outlet. It has appeared that the thickness of the exiting layer of evaporation agent is only a fraction (e.g. 10%) of the diameter of the outlet passage. The subsequent flash fragmentation results in droplets having (dependent on the pressure drop, temperature and diameter of the outlet passage) a median size of 5 μm or less. Because of the reduced size of the droplets of evaporation agent, there will be less risk of contact with the interior of the compressor unit, which means that the entire length of the compressor unit can be cooled.

It will be clear that in order to realise this fragmentation, it is important that the conditions (in particular the changing of conditions) under which the evaporation agent is atomised in the gaseous medium must be optimal for fragmentation. Important conditions for flash fragmentation are the temperature of the evaporation agent, the atomisation pressure under which the evaporation agent is atomised in the gaseous medium, and the outlet passage diameter. Therefore, the flash atomisation unit preferably, has means for adjusting the temperature of the evaporation agent and/or the atomisation pressure.

As indicated above, known atomisers may, in principle, be used in the compressor device according to the invention. These atomisers may release the evaporation agent in the gaseous medium in a direction which is either traverse or parallel to the flow of the gaseous medium. The atomised evaporation agent may possess a radial or axial component vis-a-vis the gaseous medium. A radial component is important in order to avoid coalescence of the fragmentised droplets of evaporation agent and may be realised e.g. by applying a swirl atomiser. An axial component is important in order to transfer the energy of the evaporation agent as much as possible to the gaseous medium, such that the pressure drop is low or even negative. In the event the existing compressors or compressor systems for instance energy installations are retrofit, pre-position is provided for a spraying rack with swirl atomisers. This spraying rack should preferably be positioned close to the medium inlet of the compressor so that there is hardly any opportunity for droplet coalescence or heating of the medium. Under similar conditions it is also possible to include the atomisers in the blades of the compressor and to atomise from the stator or rotating compressor blade. The swirl atomiser and the slot atomiser or orifice atomiser in particular are preferred here because they are of a very simple construction and are quite easy to miniaturise. Accordingly, very large numbers of atomisers may be implemented in advance without requiring too extensive changes in the existing compressor device, thus enabling an optional but also large flow rate of fragmentised evaporation agent. A retrofit set up in this manner effectively reduces both the compression discharge temperature and the compression work.

If, furthermore, the means for adjusting the temperature adjusts the temperature of the evaporation agent preferably to or near the critical temperature, the evaporation agent attains a surface tension which is virtually or precisely 0 $N/m^2$. This means that little or no further energy is required to atomise the liquid, so that the droplet size will be extremely small (a median droplet size of up to 0.1 μm is possible) and the use of other means for reducing the surface tension may be dispensed with. Depending on the amount of liquid evaporation agent that is atomised in the medium and the distance to the medium inlet of the compressor, the temperature of the medium/evaporation agent to be compressed may increase, e.g. from 15° C. to 23° C. and 30° C. at a final water content in the medium that leaves the compressor unit of 10 and 18 mol % respectively. Therefore, it is advantageous if the temperature of the evaporation agent to be atomised—water in particular—before atomisation is as low as possible. Finally, because of the extremely small size of the droplets, an optimal and maximum evaporation and consequently cooling will occur, as a result of which the compression work is minimal and therefore the forming of $NO_x$ as well.

Besides the aforementioned physical conditions for fragmentation it is also possible to promote fragmentation by adding chemical or physical additives to the evaporation agent. It is therefore preferable to add agents to the evaporation agent which reduce its surface tension, thereby reducing the energy required for the fragmentation. Agents that can be used to reduce the surface tension are detergents and the like. Preferred surface tension reducing agents are those that do not only reside at the interface of the evaporation agent and medium but that are also virtually homogeneously distributed throughout the evaporation agent (droplet or film). Thus, a reduced reduction of the surface tension is not required after atomisation and prior to fragmentation as a consequence of diffusion. Under such conditions the use of fatty acids, shortened fatty acids in particular, is preferred or, possibly, alcohol, e.g. methanol or ethanol. Use of the latter substances is especially preferred in the event they are to be added to gaseous mediums that are subsequently used in a combustion process. Thus, the risk of these additives negatively influencing the combustion process is avoided.

According to another preferred embodiment, the evaporation agent, generally includes a number of evaporation substances that each feature different boiling points. In particular, as the result of a pressure drop when the flash atomisation unit is passed, the vaporisable substances with the lowest boiling points will be the first to evaporate in a flash, forming boiling bubbles, as a result of which the remaining (liquid) evaporation agent will explode or fragment into small droplets. The mixture may e.g. be a mixture of water and carbon dioxide or a mixture of water and carbon monoxide.

The addition of a vaporisable substance having a lower boiling point also results in a further reduction of temperature in the atomised droplets. The atomisation of water, which is saturated with carbon dioxide (approx. 7% by wt at 150 bar) at 150 bar and 15° C. results, when it is suddenly expanded to 1 bar, in a lowering of the temperature to 12.5° C.

In principle, the compression device according to the invention may be applied under all kinds of conditions, in particular under conditions requiring isothermal or quasi-isothermal compression for reasons of efficiency, and such under conditions that leave little time for evaporation as a result of the limited residence time before, in or after the compression unit.

The compression device according to the invention turns out to be well applicable in systems for generating energy, such as compressor units provided with gas turbines as well as installations for gas separation or combustion engines. In principle, the invention is applicable to all gases that have to be compressed, such as natural gas, ammoniac, air, nitrogen and oxygen, hydrogen, synthesis gas, carbon dioxide and inert gases.

The compression device according to the invention may also be used in a rotating or piston engine, such as a combustion engine, e.g. a gas engine, diesel engine and Otto engine. The piston compression in a piston compressor or during the compression stroke in a combustion engine may be reduced in work in the same manner as in the axial or radial (gas turbine) compressor by applying quasi-isothermal compression. In a diesel engine with turbo-charger atomisation may take place both before and in the turbocharger and before and in the compression chamber. The finely atomised water will evaporate and the temperature and the compressor-work will be lower than with adiabatic compression.

As indicated above, in a combustion engine the flash atomisation unit is preferably incorporated in the separate compression chamber or compression unit. Thus, quasi-isothermal compression may occur during the compression stroke of the combustion engine. A heat exchanger is arranged between the compression chamber or unit and the combustion chamber of the combustion engine which is in heat-exchanging contact with an exhaust outlet of the combustion engine. Thus it is possible to recuperate heat in the cool, compressed air from the heat of the exhaust gases.

The features stated and other features of the compressor device and of the systems in which such devices are used, will be given below as examples without restricting the invention thereto.

DETAILED DESCRIPTION OF THE PREFERRED EMBODIMENTS

Figure 1:
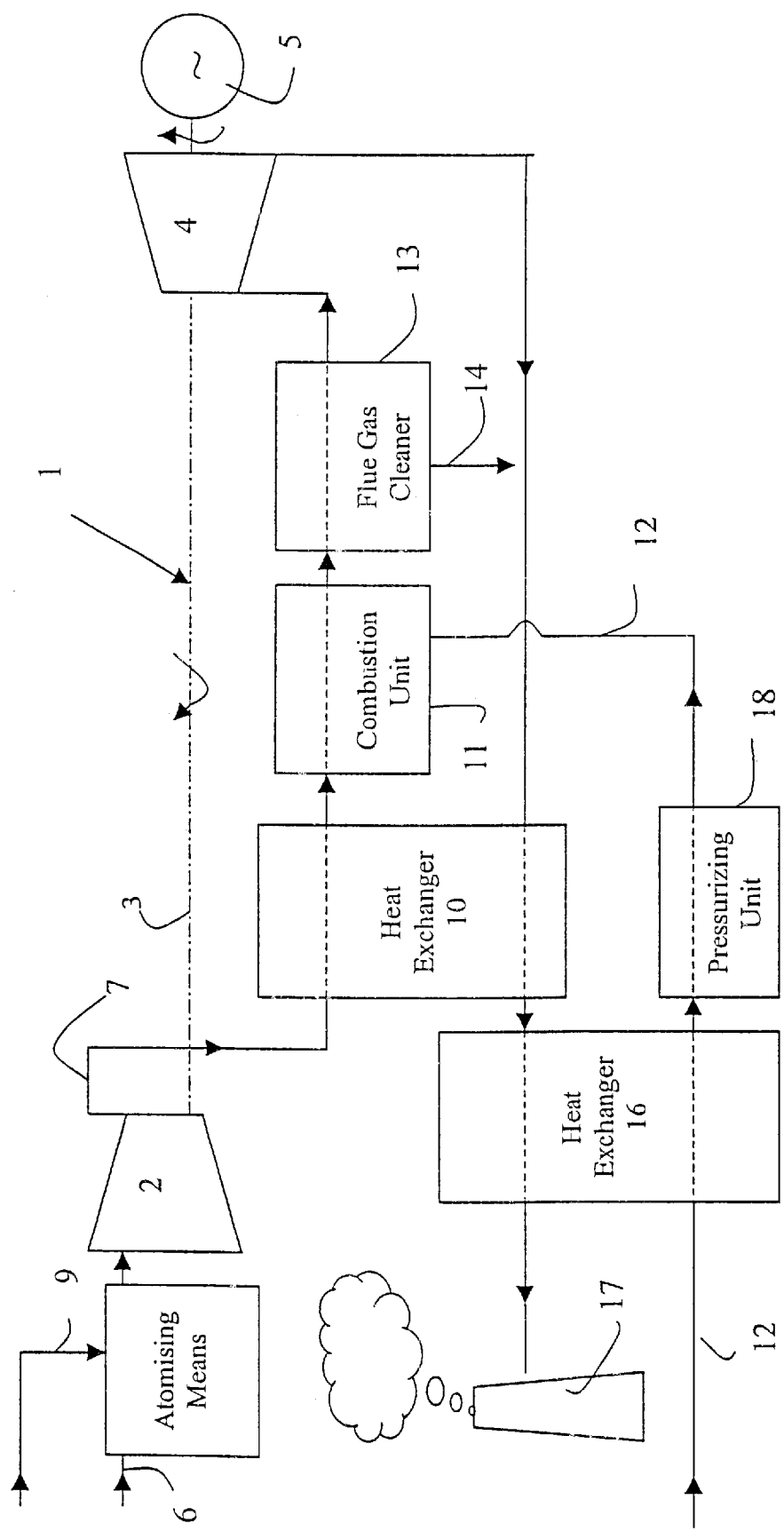
FIG. 1 is a schematic representation of a system for generating energy (biomass TOP Humidified Air Turbine (TOPHAT)); utilising flash atomisation according to the invention.

FIG. 1 shows a system 1 for generating energy. The system 1 includes a compressor unit 2 driven via a shaft 3 by a gas expansion turbine 4, which also drives a generator 5.

The compressor unit 2 is provided with a (medium) air inlet 6 and an outlet 7 for compressed air. In the air inlet 6, atomising means 8 are included for atomising evaporation agent, in this case water is supplied via water supply 9, into the air. The atomising means 8 comprise a casing containing a ring through which the air flows that is to be compressed. This ring contains a large number of (known) flash atomisation units spaced over the circumference at short distances from each other, each connected to the water supply 9. In the heat exchanger 16—and if so required in heat exchanger 10—the water is preheated to 140–250° C. The flash atomisation units are constructed as swirl atomisers (see FIG. 7) and water droplets with a median size of 1–2 $\mu$m are ejected into the air. The maximum flow rate of ejected atomised water droplets is 20 kg/s, at an air flow rate of 100 kg/s. For existing compressor units, as present in a gas turbine, the traditional flow rate will be at most 5% of the air supply; for new gas turbines at most 20%.

After passing though a recuperator 10, the is compressed and heated gas is brought, via outlet 7, into the combustion unit 11, to which fuel is fed via the fuel inlet.

The flue gas is cleaned in unit 13, wherein the ashes are removed via outlet 14. The cleaned flue gas drives gas turbine 4. After passing the gas turbine, the gas passes the recuperator 10 and a heat exchanger 16 via line 15 and leaves the system 1 via the stack 17.

If the fuel is biomass, the dried biomass originating from the heat exchanger 16 is pressurised in unit 18.

Figure 2:
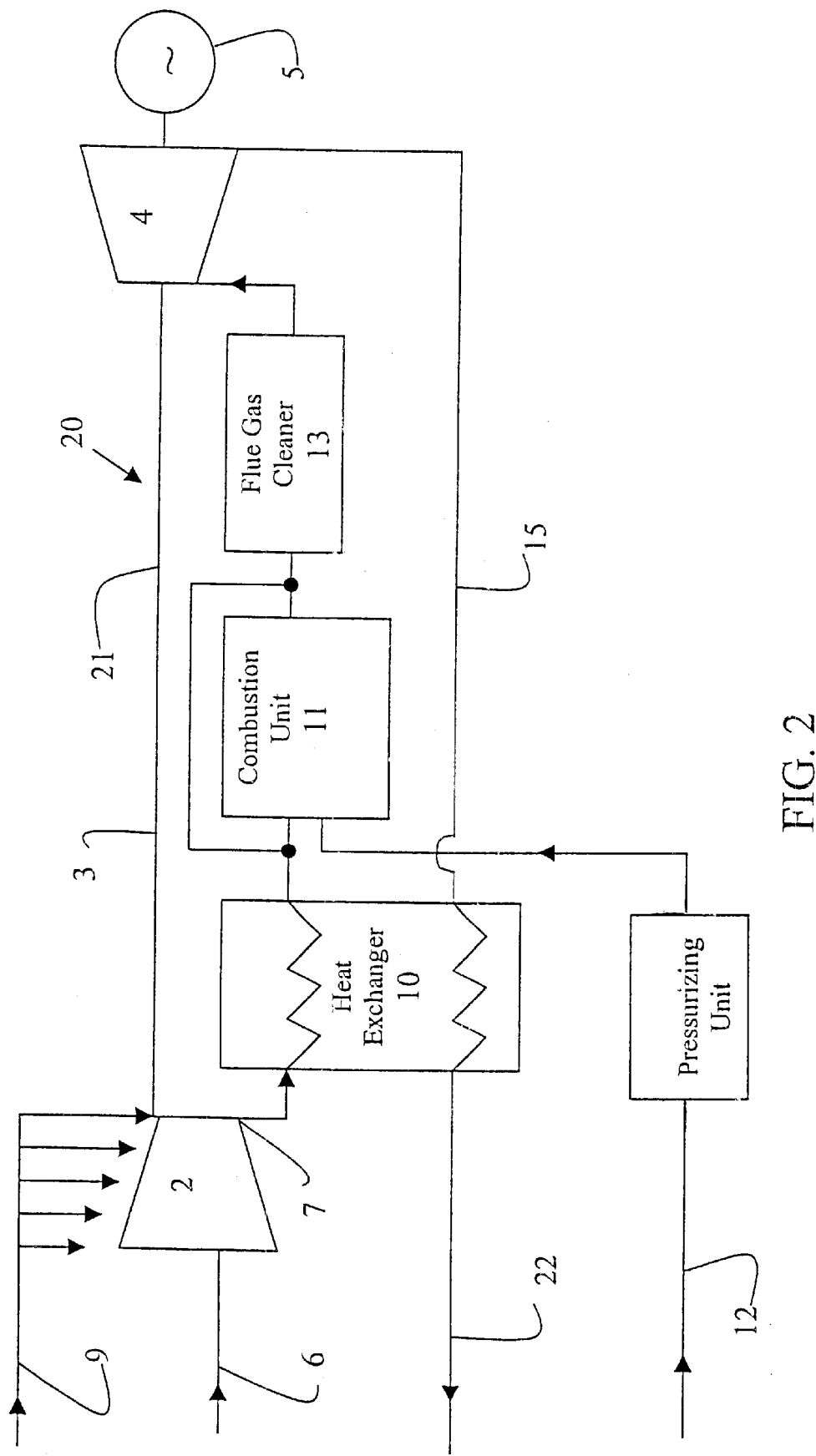
FIG. 2 is a schematic representation of another system for generating energy (coal-TOPHAT)

FIG. 2 shows a similar system 20, for the generating of energy. Identical units are indicated by identical reference numbers.

In system 20 the evaporation agent (water) is supplied via water supply 9 prior and to the various compression stages of the compressor unit 2. To this end, the compressor unit 2 comprises a number of atomising means, each mounted with flash atomisation units. Thus quasi-isothermal cooling is obtained. Furthermore, reference is made to the presence of a bypass line 21 for the combustion unit 11 such that the combustion temperature and/or the temperature of the turbine can be adjusted. The gas that leaving gas turbine 4 via line 15 is removed via line 22.

Figure 3:
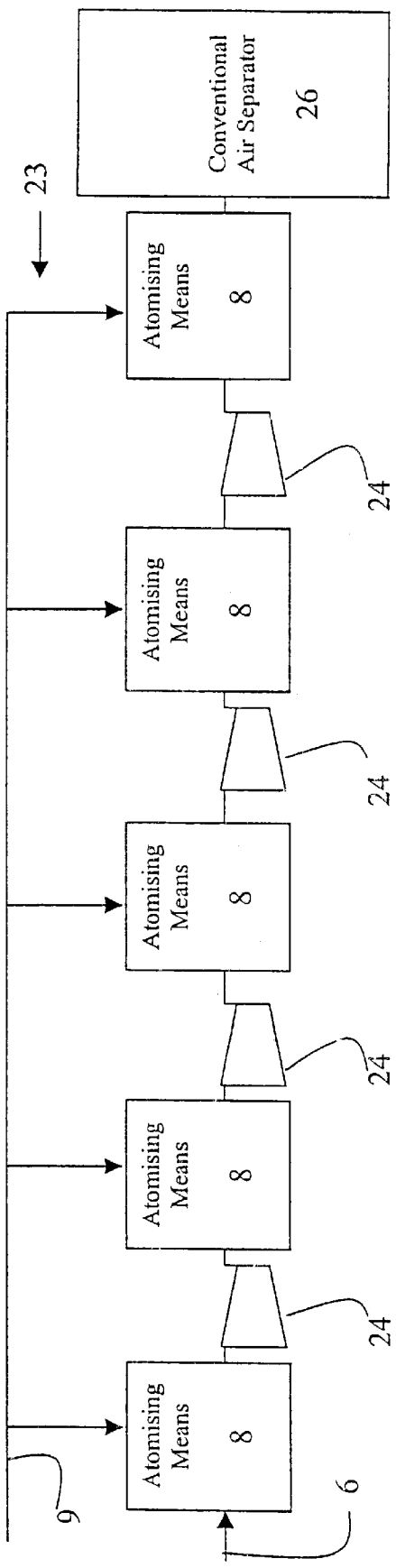
FIG. 3 represents a system for air separation.

FIG. 3 shows a system 23 for compression for air separation. Via a number of compressors 24 the air supplied via inlet 6 is pressurised. The air is cooled with water that is added to the atomising means 8, of which at least one contains a flash atomisation unit, via line 9. The pressurised air is supplied to the conventional air separator 26. In a variant to the system 23 shown in FIG. 3, which includes only one compressor 24 and atomising means 8, which atomises the evaporation agent by flash atomisation in the air supplied via inlet 6. The air (29 kg/s) is compressed quasi-isothermally under flash atomisation of water (100 bar at 200° C.). The air is heated from 15° C. to 83° C. It is subsequently cooled to 25° C. The compression work is 5.3 MW. The cooling capacity is 6.9 MW. If adiabatic compression was applied (5 bar at 200° C.), followed by cooling to 25° C., the compression work is 5.6 MW and the cooling capacity 5.9 MW. By using the system according to the invention the energy consumption is reduced with 5.5%. Moreover, the capacity of the compressor 24 increases by approximately 10%;. The cooling capacity increases notably, as a result of the presence of water in the air and the fact that the increased capacity is caused by condensation of the water.

For the compression of oxygen, nitrogen and hydrogen from ambient pressure to 16 bar, the state of the art uses multi-stage compressors with intermediate intercoolers. For oxygen (32 kg/s), the oxygen is adiabatically compressed in a first compressor stage to 4 bar (temperature 175° C.) and subsequently cooled down to 40° C., whereby the pressure is reduced to 3.8 bar. The compression work is 4.7 MW and the cooling capacity 4 MW. In a second compressor the oxygen is compressed to 8 bar (at 214° C.) and subsequently cooled to 25° C. In this case the compression work is 5.8

MW and the cooling capacity 5.5 MW. The total amount of compressor energy is 10.5 MW and the total cooling capacity 9.5 MW.

In the event of quasi-isothermal oxygen compression according to the invention, utilising the atomising means 8 according to the invention, 4 kg/s water at 100 bar and 200° C. is atomised in the oxygen via flash atomisation. The compressed oxygen (131° C.) is subsequently cooled to 25° C. In this case the compression work is 10.4 MW and the cooling capacity 12.8 MW. The increase of the cooling capacity is caused by the condensation of water, which reduces the costs of cooling. By using one compression step only, the construction of the device is considerably simpler, which reduces the costs of the device substantially. An additional advantage for the compression of oxygen and hydrogen is increased safety, as a result of the inherently lower temperatures over the entire pressure range, together with the presence of water droplets, making the process considerably safer.

Figure 4:
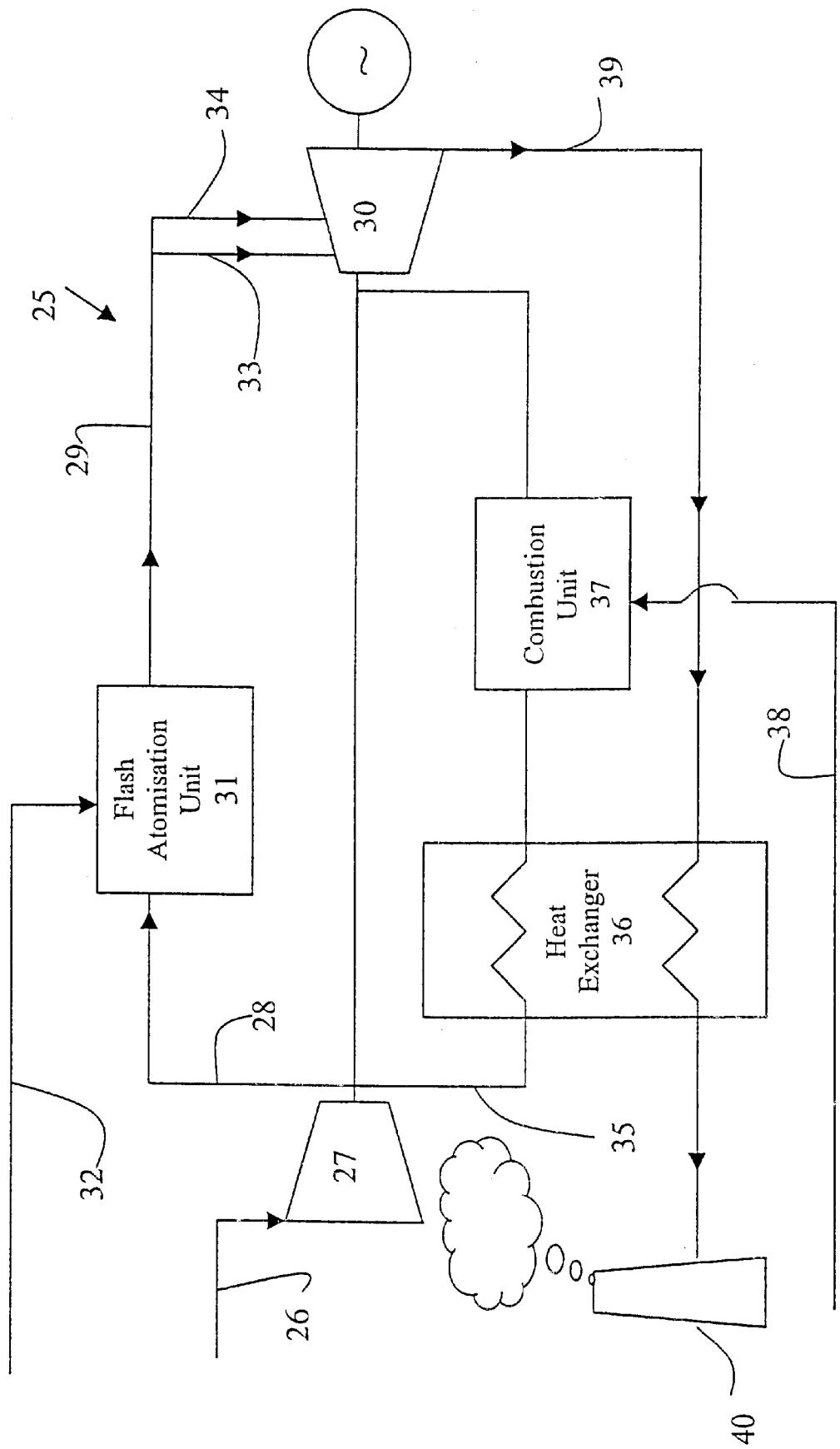
FIG. 4 is a schematic representation of still another system for generating energy, with specific attention for the cooling of hot gas parts.

FIG. 4 shows a system 25 for generating energy. System 25 includes a compressor 27 mounted with an air inlet 26, and an outlet 28 for compressed air, which connects to the inlet 29 for the cooling air of turbine 30. The air inlet 29 is mounted with a flash atomisation unit 31, in which an evaporation agent, such as water, is supplied via line 32, sprayed in the compressed air, and supplied to turbine 30 via two inlets 33 and 34. In this way, it is possible to feed cooled air into the turbine. In fact, the existing rotor air coolers and optionally the booster compressor may be reduced in number or size or replaced by the flash atomisation unit described.

Incidentally, compressed air is also supplied to the combustion unit 37, via the outlet 35 and the heat exchanger 36. Fuel is supplied to the combustion unit 37 via line 38. An outlet 39 for exhaust from the turbine also passes the heat exchanger 36 and is carried away via stack 40.

In comparison with existing gas turbines mounted with rotor air coolers, the capacity of the gas turbine may be increased by applying the flash atomisation unit, e.g. from 58.7 MW to 60.8 MW or even 61.3 MW (in the latter instance the booster compressor is shut down as well).

Figure 5:
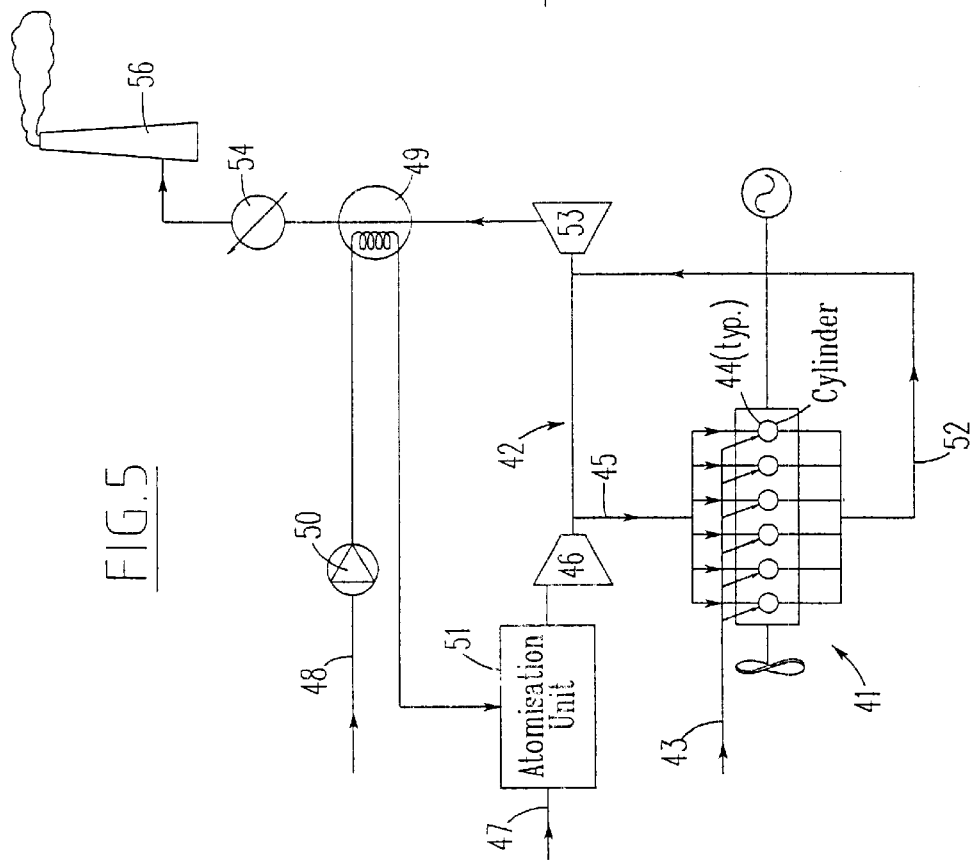

FIG. 5 shows a diesel engine 41, mounted with a turbocharger 42. Via inlet 43 diesel oil is supplied to six cylinders 44, to which the inlets for compressed air are connected as well. The air compression takes place in a compressor 46, which is connected to the main inlet and mounted with an air inlet 47. Water supplied via line 48 is brought under pressure by pump 50 and is heated in heat exchanger 49 before being supplied to the flash atomisation unit 51, by which means very finely distributed water droplets are sprayed into compressor 46.

The exhaust of the diesel engine 41 is carried off via line 52 and passes the turbine 53, the heat exchanger 49 and the valve 54 and exits the system via the stack 56, By using the flash atomisation units 51, cooler and moister compressed air is supplied to the cylinders of diesel engine 41, thus reducing the $NO_2$ emission.

Figure 6:
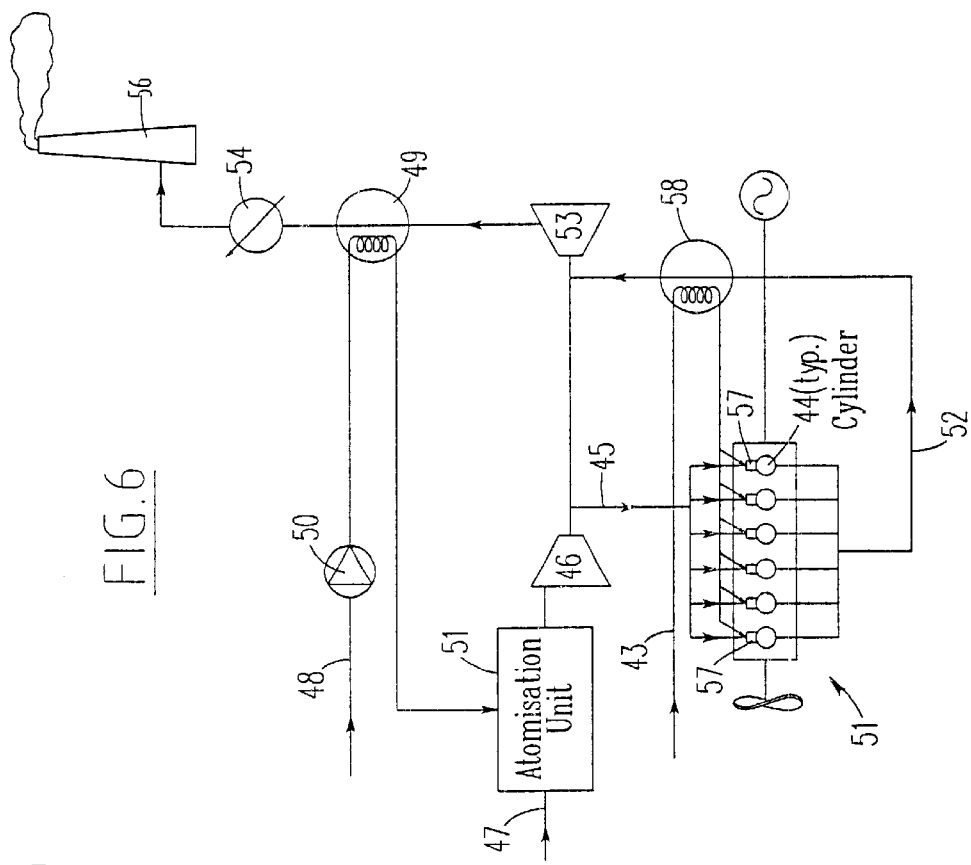
FIGS. 5 and 6 are schematic representations of ship diesel engines.

As FIG. 6 shows, in a similar diesel 56 engine flash atomisation units 57 may also be utilised in each cylinder 44 for the atomisation of diesel oil. The diesel oil is supplied via line 43 and heated up by passing it via the heat exchanger 58 and if necessary by exchanging heat with the cylinder. The diesel oil has to be brought at such temperature as to enable the flash atomisation to take place at an accepted cylinder pressure, e.g. approximately 40 bar. A further advantage is that the injection pressure may be reduced from approximately 1000 bar or more to e.g. 200 bar.

Fuels like diesel oil have a boiling range. By temperatures of 350° C., a significant flash effect will already occur for diesel oil. This may be lower for kerosene/gasoline (250/150° C.) and higher for slow speed ship diesel engines—up to 400° C. Because the combustion of much smaller droplets is much more efficient, a more homogeneous combustion will take place, which results in a lower emission of soot.

Figure 7:
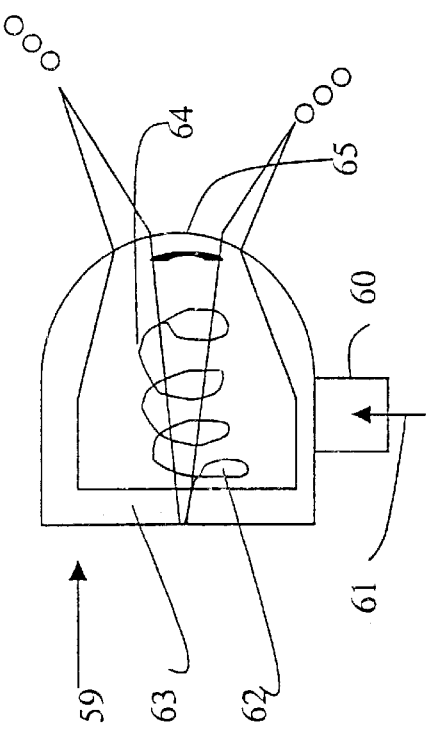
FIG. 7 is a schematic representation of a flash swirl atomiser.

FIG. 7 shows a swirl atomiser 59, as known in the state of the art. Via line 60 the evaporation agent 61 is tangentially supplied to a swirl chamber 63 via an inlet 62. The evaporation agent attains a swirling movement 64 and leaves swirl chamber 63 via outlet 65. The swirling evaporation agent enters the space in which gaseous medium is present in the shape of a cone. The thickness of the layer of evaporation agent is reduced and ends up in very tiny droplets as the result of fragmentation. It may clearly be observed that the thickness of the layer of evaporation agent is less than the diameter of the outlet passage 65 of the swirl chamber 63. Because of the smaller size and relatively simple construction of the swirl atomiser 59, large numbers of such swirl atomisers may be applied for the flash atomisation of the liquid evaporation agent in the gaseous medium being or to be compressed.

Figure 8:
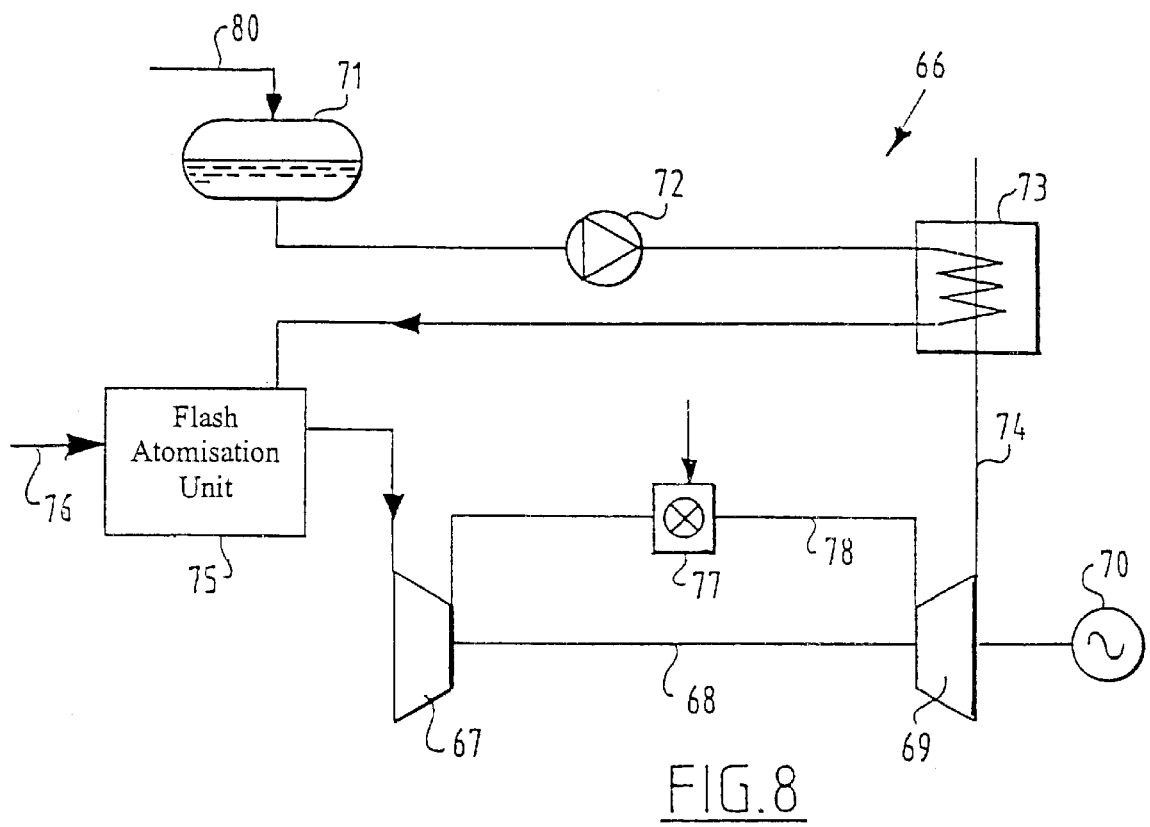
FIG. 8 is a schematic representation of a swirl-flash retrofit system for generating energy.

FIG. 8 shows a system 66 for generating energy. This system 66 includes a compressor 67, connected to a turbine 69 by a shaft 68. Turbine 69 drives a generator 70. From a vessel 71 water at 15° C. is pumped via a heat exchanger 73 by a pump 71. In heat exchanger 73 the water is heated to 140–250° C. by exchanging heat with the exhaust 74 of turbine 69. This warm and pressurised water is supplied to the flash atomisation unit 75, in which the water is atomised in air 76 of 15° C. After quasi-isothermal compression in the compressor 67 the compressed air is supplied to a combustion unit 77, after which the exhaust gases are supplied to turbine 69 via the line 78.

The use of the compressor device (of the type shown in FIG. 8 according to the invention) has been studied with an existing system according to the invention: an Allison Centrax 400 kW gas turbine. This gas turbine is retromounted. In an early model 21 swirl atomisers with a 0.2 mm bore are mounted in the air inlet. In a second model 14 swirl atomisers with a 0.4 mm bore are mounted in the air inlet. A series of tests was carried out at charges of 100, 200, 300, and 400 kW respectively. These tests were carried out at these charges with and without water injection. The relative amount of injected water was 1.3% and 1.0%, respectively. During the tests, the charge of the gas turbine was maintained at permanent level by adjusting the turbine inlet temperature. In order to attain a first rate forecast for the increase of capacity, the full load capacity and the $NO_x$ emission, interpolations and extrapolations were carried out.

The results are given in the table below.

|  | Relative amount of water injection (%) | |
| --- | --- | --- |
|  | 1.0 | 1.3 |
| Increase full load capacity (%) | +5.4 | +9.2 |
| Relative increase of efficiency (%) | +1.5 | +2.9 |
| Reduction in $NO_x$ emission (%) | +16 | +21 |

The use of the compressor device according to the invention in the Centrax 400 kW gas turbine resulted in a considerable reduction of the $No_x$ emission. Moreover, the full load capacity increases as well as the relative efficiency. It may be clear that by retrofitting existing gas turbines the output and full load output may be improved and the emission of $No_x$ reduced.

Figure 9:
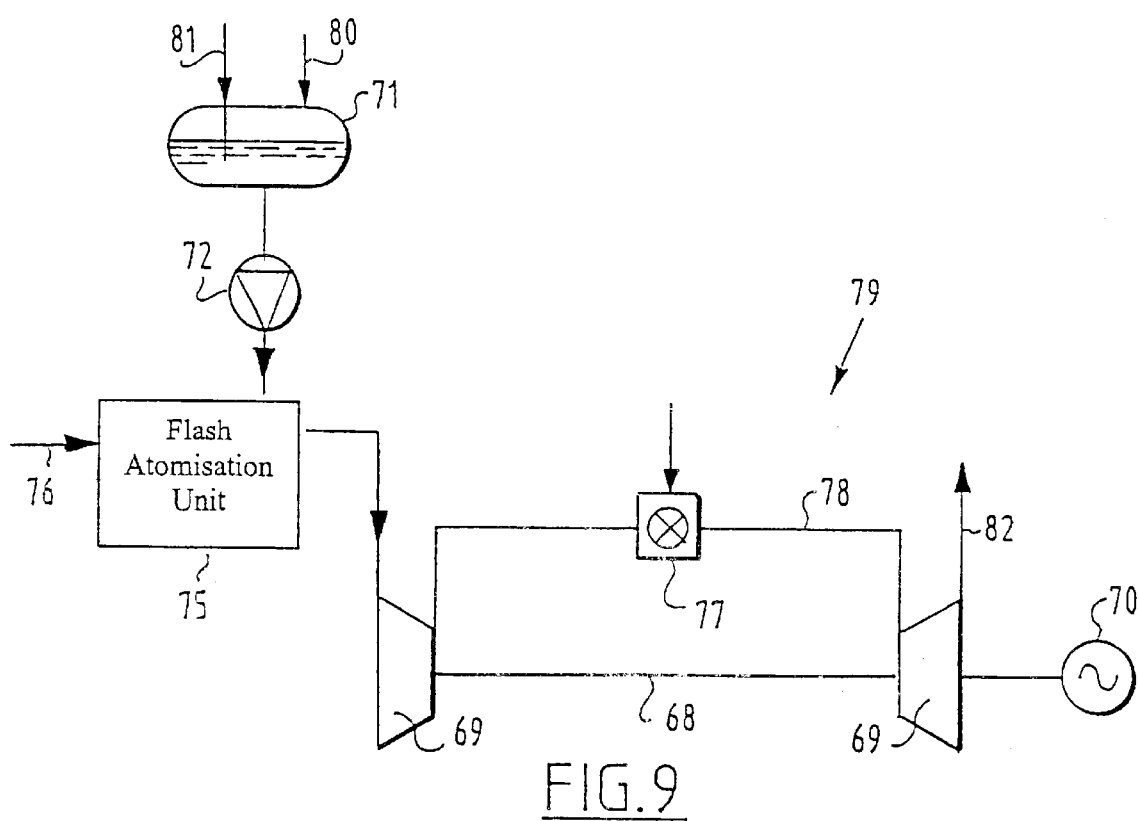
FIG. 9 is a variant of the system shown in FIG. 8, which uses an evaporation agent comprising evaporation substances with different boiling points.

FIG. 9 shows a system 79 for generating energy. In comparison with system 66—FIG. 8—not only water 80 is supplied to the vessel 71 but carbon dioxide 81 as well. The water in the vessel 71 is saturated with carbon dioxide. This water is supplied under pressure to the flash atomisation unit 75 by means of pump 72 in order to cool the air 76 by generating very small water droplets. The moistened air is subsequently compressed in the compressor 67 while water droplets are evaporated. After combustion with fuel in the combustion unit 77, the exhaust is carried off via the exhaust outlet 82 via turbine 69 which drives the generator 70.

Figure 10:
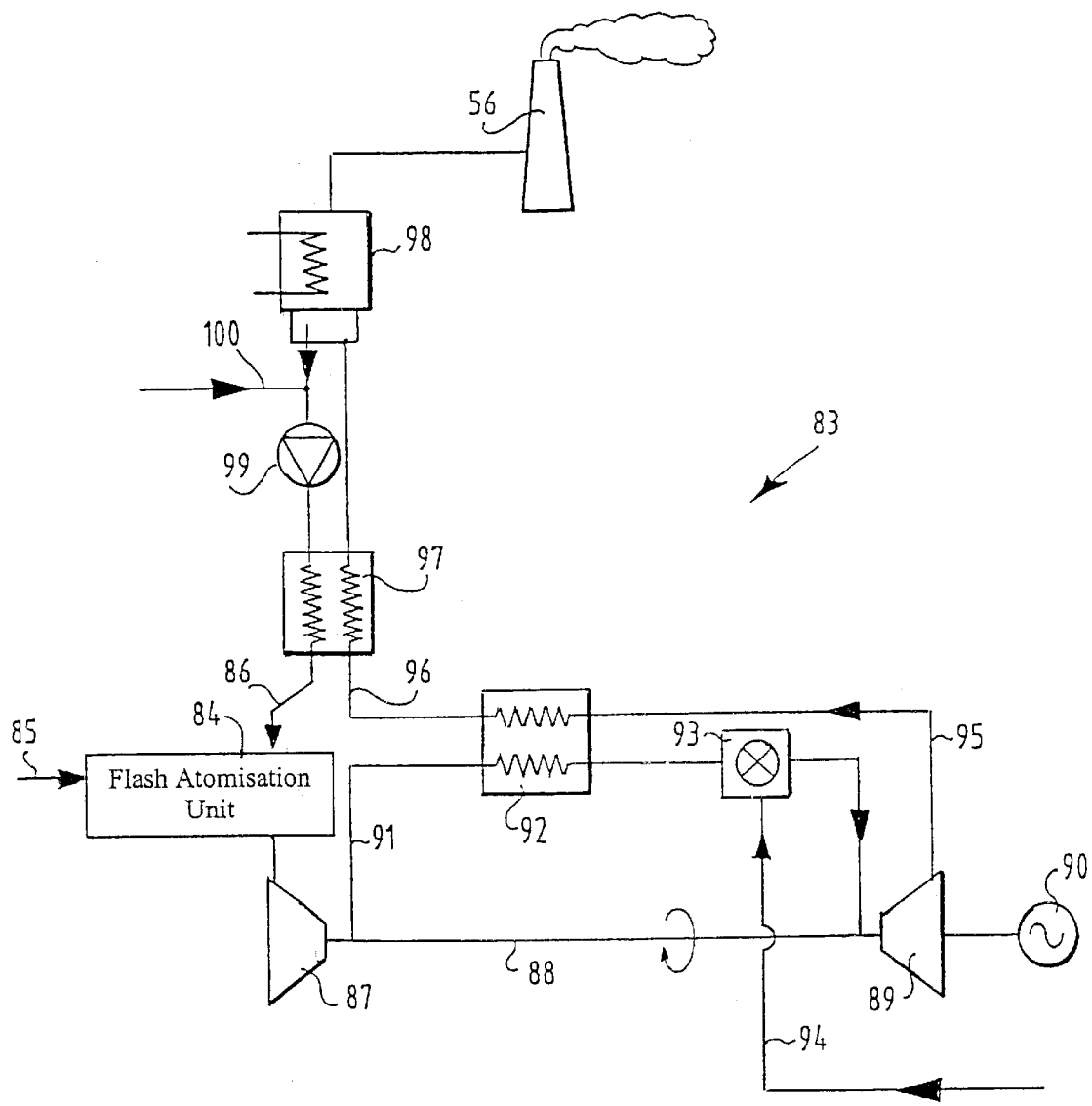
FIG. 10 shows another system for generating energy according to the invention according to the TOPHAT principle.

FIG. 10 shows another system 83 for generating energy according to the invention, in accordance with the so-called TOPHAT principle. Air 85 is moistened and cooled in a flash atomisation unit 84 by means of water 86 supplied by means of flash atomisation. The air is supplied to a compressor 87 connected by a shaft 88 to a gas turbine 89 which drives a generator 90. The cool, compressed air passes a heat exchanger 92 via a line 91 and is supplied to the combustion unit 93, to which fuel is supplied via the line 94. The exhaust of gas turbine 89 passes the heat exchanger 92 via line 95 to be brought in heat exchanging contact with the cool, compressed air from the compressor 87. Via the line 96 the exhaust passes a heat exchanger 97 and the condenser 98 on its way to the stack 99. In the condenser 98 water is condensed from the exhaust and pumped under pressure by pump 99 to the heat exchanger 97, after which the water 86, now under pressure and at the right temperature, reaches the flash atomisation unit 84. If necessary, water may be added to the condense water from the condenser 98 via line 100.

Figure 11:
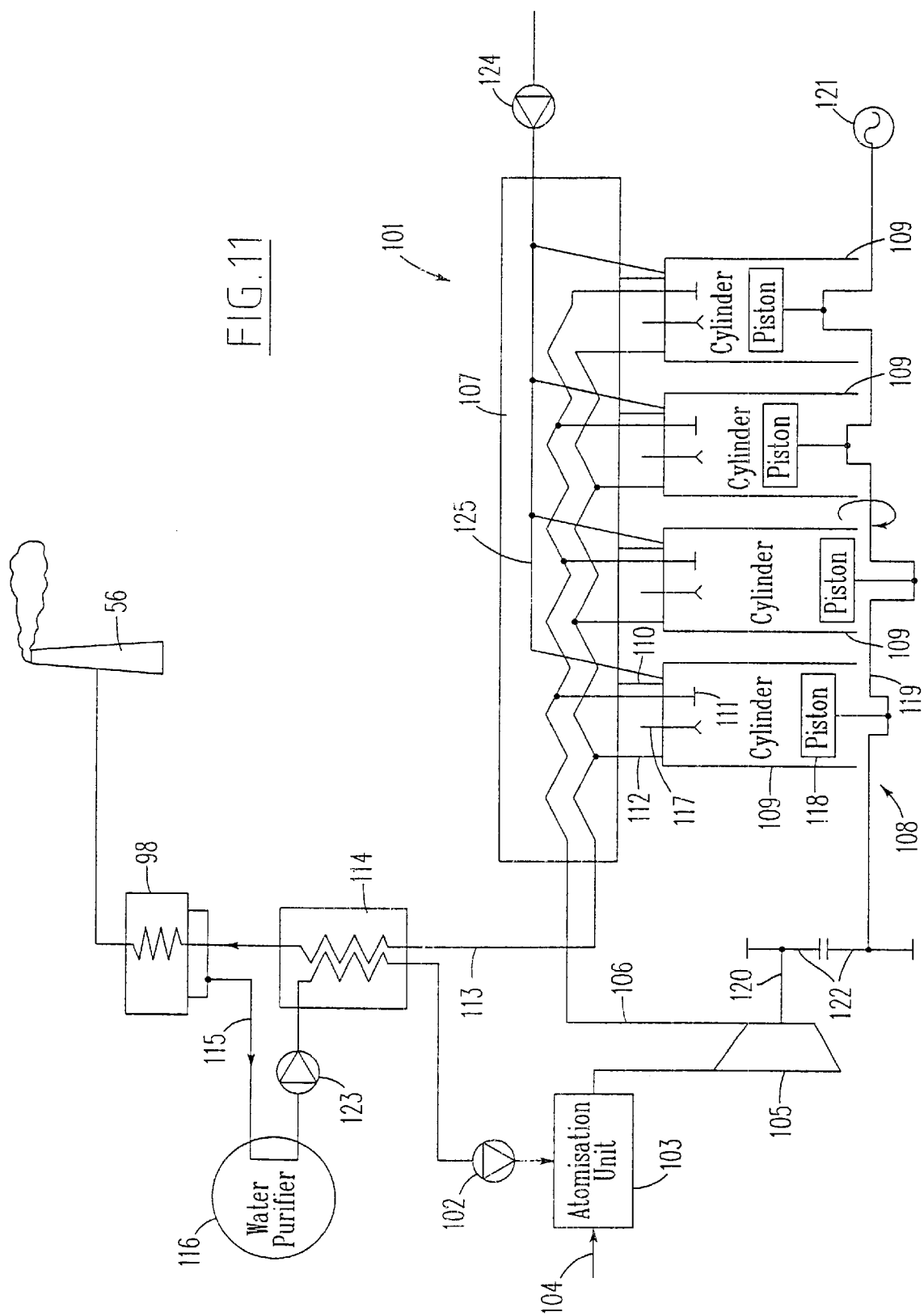
FIG. 11 shows a energy generating system according to the TOPHACE principle (TOP Humidified Air Combustion Engine).

FIG. 11, finally, shows a system 101 according to the invention for generating energy in accordance with the TOPHACE principle.

Water at 140–250° C. and 150 bar, is pumped by pump 102 to a flash atomisation unit 103 to which air is supplied via line 104 (at 15° C.). From the flash atomisation unit 103 the air reaches a compressor 105 which works with an efficiency of 0.8. The compressed air (now 140° C.) is supplied via line 106 to a heat exchanger 107 to exchange heat with the exhaust gases of a combustion engine 108. The combustion engine comprises four cylinders 109 from which an air inlet 110 connects to the line 106 via a valve 111. From each of the cylinders 109 an exhaust pipe 112 passes the heat exchanger 107 and is led via a heat exchanger 114 via the line 113 and ends up via the condenser 98 in the stack 99. In the condenser 98 condense 115 is formed which after passing a water purifier 116 and after being brought under pressure by a pump 123 is added to the pump 102 via the heat exchanger 114.

Fuel is supplied to each of the cylinders by the pump 124 via line 125 and the valves (not shown).

In the recuperator the air is heated from 140° C. to 377° C., whereas the exhaust from the cylinders 109 is cooled down from 465° C. to 210° C. At a pressure of 9 bar, the air is supplied to the cylinders 108 and atomised fuel is injected. The cylinders 109 are also mounted with an ignitor 117 for igniting the mixture in each of the cylinders 109. The cylinders 109 are all mounted with a piston 118 connected to a shaft 119 which in turn is connected to the shaft 120 of the compressor 105 at one end and with the generator 121 on the other, via a 1:5 gear assembly 122.

Under ideal conditions, system 101 provides a power of 226 kW at 64% efficiency. A known device according to the Atkinson principle provides power of only 170 kW at 48% efficiency.

What is claimed is:

1. A device for compressing a gaseous medium, comprising a compressor unit provided with a medium inlet, a compressed medium outlet, and means for atomising an evaporation agent in the medium, wherein the atomising means includes at least one flash atomisation unit arranged and mounted such that the atomised evaporation agent fragmentises by means of formation of gas in the atomised evaporation agent, wherein the flash atomisation unit is a flash swirl atomisation unit.

2. The device according to claim 1, wherein the flash atomisation unit includes means for adjusting the temperature of the evaporation agent.

3. The device according to claim 2, wherein the means for adjusting the temperature of the evaporation agent at or near the critical temperature of the evaporation agent.

4. The device according to claim 1, wherein the evaporation agent includes agents for reducing the surface tension of the evaporation agent.

5. The device according to claim 4, wherein the agents for reducing the surface tension includes combustible or vaporisable substances.

6. The device according to claim 1, wherein the evaporation agent is a mixture of evaporation substances having different boiling points.

7. The device according to claim 5, wherein the mixture comprises water and carbon dioxide or water and carbon monoxide.

8. The device according to claim 1, wherein the atomising means are arranged and mounted such that the evaporation agent is added before, during, or after compressing the medium.

9. The device according to claim 8, wherein the atomising means are arranged and mounted such that cooling takes place over substantially the entire length of the compressor unit.

10. A system for generating energy comprising at least one gas turbine and at least one compressor unit driven by the gas turbine, with the compressor unit including a medium inlet, a compressed medium outlet, and means for atomising an evaporation agent in the medium, wherein the compressor unit has at least one flash atomisation unit arranged and mounted such that the atomised evaporation agent fragmentises by means of the formation of gas in the atomised evaporation agent, wherein the flash atomisation unit is a flash swirl atomisation unit.

11. The system according to claim 10, wherein the flash atomisation unit is incorporated in an air supply line of the compressor device.

12. The system according to claim 10, wherein a flash atomisation unit is incorporated in a cool-air supply line of the gas turbine.

13. The system according to claim 10, wherein the system is connected to a combustion engine.

14. The system according to claim 12, wherein the flash atomisation unit is incorporated in either the air inlet or in the fuel inlet of the combustion engine.

15. The system for generating energy as claimed in claim 10, further comprising a heat exchanger for heat exchanging contact between compressed medium supplied to the combustion engine and exhaust gas originating from the combustion engine.

16. The device according to claim 1, wherein the flash atomisation unit includes means for adjusting the atomise pressure.

17. The device according to claim 2, wherein the flash atomisation unit includes means for also adjusting the temperature of the evaporation agent.

18. The system according to claim 13, wherein the flash atomization unit is incorporated in either the air inlet or in the fuel inlet of the combustion engine.

* * * * *

UNITED STATES PATENT AND TRADEMARK OFFICE
CERTIFICATE OF CORRECTION

PATENT NO. : 6,453,659 B1
DATED : September 24, 2002
INVENTOR(S) : Jacobus Van Liere et al.

It is certified that error appears in the above-identified patent and that said Letters Patent is hereby corrected as shown below:

Title page,
Item [56], References Cited, OTHER PUBLICATIONS, insert -- "Gas Turbine," Patent Abstracts of Japan, European Patent Office, Publication No. 59160032, Publication Date 09/10/84, 1 p. --.

Column 6,
Line 11, "the is" should read -- the --.
Line 54, "10%;." should read -- 10%. --.

Signed and Sealed this

Fourth Day of March, 2003

JAMES E. ROGAN
*Director of the United States Patent and Trademark Office*